United States Patent
Li et al.

(10) Patent No.: US 10,051,639 B2
(45) Date of Patent: Aug. 14, 2018

(54) METHOD AND APPARATUS FOR CHANNEL SWITCH AND WIRELESS TERMINAL

(71) Applicant: Huawei Technologies Co., Ltd., Shenzhen (CN)

(72) Inventors: Yunbo Li, Shenzhen (CN); Lianbo Zhang, Shenzhen (CN); Yi Luo, Shezhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 14/941,459

(22) Filed: Nov. 13, 2015

(65) Prior Publication Data

US 2016/0073414 A1 Mar. 10, 2016

Related U.S. Application Data

(63) Continuation of application No. PCT/CN2013/087256, filed on Nov. 15, 2013.

(30) Foreign Application Priority Data

May 14, 2013 (CN) .......................... 2013 1 0177761

(51) Int. Cl.
*H04W 4/00* (2018.01)
*H04W 72/08* (2009.01)
(Continued)

(52) U.S. Cl.
CPC .......... *H04W 72/08* (2013.01); *H04W 16/14* (2013.01); *H04W 72/0446* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 7,894,840 B2 * | 2/2011 | Ito ......................... H04W 36/18 455/509 |
| 8,432,858 B2 * | 4/2013 | Kobayashi ............ H04W 28/26 370/322 |

(Continued)

FOREIGN PATENT DOCUMENTS

| CN | 1640062 A | 7/2005 |
| CN | 101083605 A | 12/2007 |

(Continued)

OTHER PUBLICATIONS

Black et al., "Dynamic Frequency Selection (DFS) in an Independent BSS (IBSS)," IEEE 802.11-01/532r0, pp. 1-9, Institute of Electrical and Electronics Engineers, New York, New York (Nov. 2001).

(Continued)

*Primary Examiner* — Michael J Moore, Jr.
(74) *Attorney, Agent, or Firm* — Leydig, Voit & Mayer, Ltd.

(57) ABSTRACT

The present invention discloses a method, an apparatus and a wireless terminal for channel switch, and the method includes: sending information on the target channel and a first channel within the preset channel soft switch time interval after a channel switch announcement instruction is sent on the first channel when the first channel needs to be switched, and stopping sending information on the first channel if the preset channel soft switch time interval ends. By means of above method, the probability of switch failure for the user may be reduced in a scenario with frequent channel switch.

12 Claims, 5 Drawing Sheets

(51) Int. Cl.
*H04W 16/14* (2009.01)
*H04W 72/04* (2009.01)
*H04W 84/12* (2009.01)

(56) References Cited

U.S. PATENT DOCUMENTS

| | | | |
|---|---|---|---|
| 2002/0141400 A1* | 10/2002 | DeMartino | H04L 5/16 370/386 |
| 2003/0171116 A1 | 9/2003 | Soomro | |
| 2003/0219001 A1* | 11/2003 | de Prado Pavon | H04W 74/0875 370/338 |
| 2004/0146022 A1* | 7/2004 | Lewis | G01S 7/021 370/331 |
| 2005/0013287 A1* | 1/2005 | Wallentin | H04W 28/16 370/352 |
| 2006/0179464 A1* | 8/2006 | Park | H04N 7/17318 725/95 |
| 2010/0138486 A1 | 6/2010 | Yang et al. | |
| 2010/0251296 A1* | 9/2010 | Kim | H04N 5/50 725/38 |
| 2010/0296434 A1 | 11/2010 | Amagai et al. | |
| 2011/0026481 A1 | 2/2011 | Takamatsu | |
| 2013/0135995 A1* | 5/2013 | Wu | H04W 40/12 370/229 |
| 2014/0016568 A1* | 1/2014 | Koskela | H04W 52/0206 370/329 |
| 2016/0007247 A1* | 1/2016 | Lee | H04W 36/0066 370/331 |

FOREIGN PATENT DOCUMENTS

| | | |
|---|---|---|
| CN | 101902767 A | 12/2010 |
| CN | 101981966 A | 2/2011 |
| CN | 102196515 A | 9/2011 |
| WO | WO 2005006013 A1 | 1/2005 |
| WO | WO 2009078606 A1 | 6/2009 |

OTHER PUBLICATIONS

Roy et al., "Fast Multichannel Switching for IEEE 802.11s Multiradio Wireless Mesh Networks," 2011 IEEE Globecom Workshops (GC Wkshps), Houston, Texas, pp. 303-308, Institute of Electrical and Electronics Engineers, New York, New York (Dec. 5-9, 2011).

* cited by examiner

METHOD AND APPARATUS FOR CHANNEL SWITCH AND WIRELESS TERMINAL

CROSS-REFERENCE TO RELATED APPLICATIONS

This application is a continuation of International Patent Application No. PCT/CN2013/087256, filed Nov. 15, 2013, which claims priority to Chinese Patent Application No. 201310177761.X, filed May 14, 2013, both of which are hereby incorporated by reference in their entireties.

FIELD OF THE INVENTION

The present invention relates to the technical field of mobile communications, and particularly, to a method and an apparatus for channel switching and a wireless terminal.

BACKGROUND OF THE INVENTION

At present, with the development of wireless access, there is an increasing demand for throughput and quality of service (QoS, Quality of Service) of a system operating on an unlicensed (Unlicensed) frequency band and a television white space (TVWS, Television White Space) frequency band. One characteristic of the unlicensed frequency band is that a user's right to use a frequency cannot be guaranteed. When a radar or a primary user uses a channel, it is needed to perform a channel switch for the user, and when it is detected that the channel is busy or is used by other users, the user also needs to perform backoff.

In order to guarantee high throughput or high QoS, the system is required to frequently detect channels which are currently available, and then performs a channel switch among multiple channels for a user. In a wireless local access network (WLAN, Wireless Local Access Network) system, when a frequency band on which a basic service set (BSS, Basic Service Set) operates needs a channel switch due to interference or other reasons, an announcement of this channel switch is sent by an access point. A switch command is stored in a channel switch announcement (Channel switch announcement) field and the field is usually sent through being carried in a beacon frame (Beacon). After a channel switch time starts, all users will switch to a new channel for communication.

In the long-term research and development, inventors of the present application found that the channel switch announcement in existing mechanisms is carried in the beacon frame, and although the probability of switch failure for the user may be reduced by transmitting the beacon frame multiple times, the beacon frame has a longer transmission period, and thus is not applicable to a scenario with frequent channel switching.

SUMMARY OF THE INVENTION

The embodiments of the present invention provide a method and an apparatus for channel switch and a wireless terminal, which may reduce the probability of switch failure for a user in a scenario with frequent channel switch.

In a first aspect, the embodiments of the present invention provide a method for channel switch, including: sending a channel switch announcement instruction on a first channel if the first channel needs to be switched, wherein the channel switch announcement instruction includes a channel switch time and a position of a second channel as a target channel; sending information on the first channel and the second channel within a preset channel soft switch time interval after the channel switch announcement instruction is sent on the first channel, wherein the channel soft switch time interval is a time interval after a start time of switch from the first channel to the second channel; stopping sending information on the first channel if the preset channel soft switch time interval ends.

In a first possible implementation manner of the first aspect, the sending information on the first channel and the second channel includes: sending position indicating information of the second channel on the first channel, and sending data information of a station on the second channel.

In combination with the first possible implementation manner of the first aspect, in a second possible implementation manner of the first aspect, the sending information on the first channel and the second channel includes: sending the position indicating information of the second channel and the data information of the station on the first channel, and sending the data information of the station on the second channel.

In a third possible implementation manner of the first aspect, the first channel includes a control channel or a hybrid channel of a control channel and a data channel.

In a second aspect, the embodiments of the present invention provide a method for channel switch, including: receiving a channel switch announcement instruction on a first channel, wherein the channel switch announcement instruction includes a channel switch time and a position of a second channel as a target channel; receiving information on the first channel or the second channel or the first channel and the second channel within a channel soft switch time interval after the channel switch announcement instruction is received on the first channel, wherein the channel soft switch time interval is a time interval after a start time of switch from the first channel to the second channel.

In a first possible implementation manner of the second aspect, the method further includes: stopping receiving information on the first channel after the channel soft switch time interval ends.

In a third aspect, the embodiments of the present invention provide an apparatus for channel switch, wherein the apparatus includes: a first sending module, a second sending module and a processing module, wherein the first sending module is configured to send a channel switch announcement instruction on a first channel when the first channel needs to be switched, wherein the channel switch announcement instruction includes a channel switch time and a position of a second channel as a target channel, and send the channel switch announcement instruction, which has been sent, to the second sending module and the processing module; the second sending module is configured to receive the channel switch announcement instruction sent by the first sending module, and send information on the first channel and the second channel within a preset channel soft switch time interval, wherein the channel soft switch time interval is a time interval after a start time of switch from the first channel to the second channel; and the processing module is configured to receive the channel switch announcement instruction sent by the first sending module, and stop sending information on the first channel when the preset channel soft switch time interval ends.

In a first possible implementation manner of the third aspect, the second sending module is specifically configured to send position indicating information of the second channel on the first channel, and send data information of a station on the second channel.

In combination with the first possible implementation manner of the third aspect, in a second possible implementation manner of the third aspect, the second sending module is specifically configured to send the position indicating information of the second channel and the data information of the station on the first channel, and send the data information of the station on the second channel.

In a third possible implementation manner of the third aspect, the first channel includes a control channel or a hybrid channel of a control channel and a data channel.

In a fourth aspect, the embodiments of the present invention provide a wireless terminal, wherein the terminal includes: a first receiving module and a second receiving module, wherein the first receiving module is configured to receive a channel switch announcement instruction on a first channel, wherein the channel switch announcement instruction includes a channel switch time and a position of a second channel as a target channel, and send the channel switch announcement instruction, which has been received, to the second receiving module; the second receiving module is configured to receive the channel switch announcement instruction sent by the first receiving module and receive information on the first channel, or the second channel, or the first channel and the second channel within a channel soft switch time interval, wherein the channel soft switch time interval is a time interval after a start time of switch from the first channel to the second channel.

In a first possible implementation manner of the fourth aspect, the terminal further includes a processing module, wherein the processing module is configured to receive the channel switch announcement instruction sent by the first receiving module and stop receiving information on the first channel after the channel soft switch time interval ends.

The beneficial effect of the present invention is: it is different from the prior art that when it is determined that the first channel needs switch in the embodiments of the present invention, information is sent on the target channel and the first channel within the preset channel soft switch time interval after the channel switch announcement instruction is sent on the first channel, and sending information on the first channel is stopped after the preset channel soft switch time interval ends. Since information is sent on both the target channel and the first channel within the preset channel soft switch time interval, in this way, the probability of switch failure for the user can be reduced in a scenario with frequent channel switch.

DETAILED DESCRIPTION OF THE EMBODIMENTS

A detailed description of the present invention will be given below in conjunction with the drawings and the embodiments of the present invention.

Figure 1:
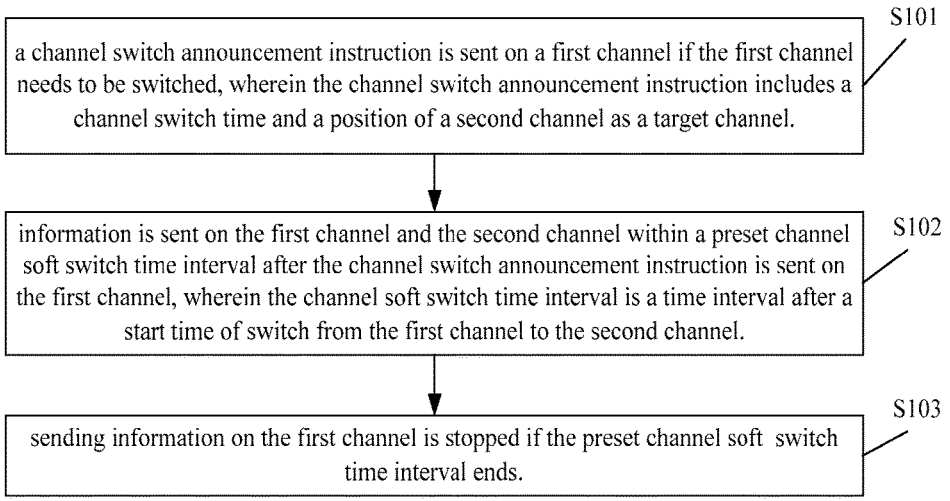
FIG. 1 is a flowchart of an embodiment of a method for channel switch in the present invention.

Referring to FIG. 1, FIG. 1 is a flowchart of an embodiment of a method for channel switch in the present invention. It should be noted that an executive body of the present embodiment is a service access point of a communication system, and the process includes:

Step S101: a channel switch announcement instruction is sent on a first channel if the first channel needs to be switched, wherein the channel switch announcement instruction includes a channel switch time and a position of a second channel as a target channel.

A channel is a one-way or two-way path for sending and receiving a signal between two points and is divided into a wire channel and a wireless channel. A switch refers to a process of changing from a cell or a channel to another cell or channel. In the present invention, a channel switch refers to a process of switch from a channel (i.e., a first channel) to another channel (i.e., a target channel or a second channel).

A system frequently detects currently available channels, and when the first channel needs to be switched due to interference, regulation restriction, backoff or other reasons, the channel switch announcement instruction is sent on the first channel, wherein the channel switch announcement instruction includes the channel switch time and the position of the second channel as a target channel, wherein the channel switch time is a start time or an end time of switch from the first channel to the second channel. In a practical application, the channel switch time generally refers to the start time of switch from the first channel to the second channel.

The channel switch announcement instruction is sent in an explicit manner or an implicit manner, wherein the explicit manner is a manner of making an announcement through an instruction, and the implicit manner is a manner of making the announcement through an appointed or default rule. For example, an explicit manner: a channel switch time and a position of the second channel are directly designated; the implicit manner: a channel which satisfies certain condition is specified as the second channel as a target channel.

The first channel may be a control channel, or a hybrid channel of a control channel and a data channel. The control channel, or called signal channel, main channel, anchoring channel or the like, refers to a channel used for sending control and management information, and the data channel refers to a channel used for sending data information.

Step S102: information is sent on the first channel and the second channel within a preset channel soft switch time interval after the channel switch announcement instruction is sent on the first channel, wherein the channel soft switch time interval is a time interval after a start time of switch from the first channel to the second channel.

A mode of a channel switch is divided into a hard switch and a soft switch, wherein the hard switch is a switch between base stations or covered cells at different frequencies. Such switch process is a process that a mobile station (i.e., a wireless terminal) first temporarily breaks a call, transfers a switch signalling on a channel having contact with an original base station, and the mobile station is automatically tuned to a new frequency and contacts a new base station, and establishes a new channel and thus the switch is completed. To put it simply, a characteristic of the hard switch is "break-before-switch". The soft switch is that the mobile station keeps contact with both the original base station and the new base station when entering the switch process, and the contact with the original base station is not cut off until the mobile station enters a coverage area of the new base station and it is detected transmission quality between the mobile station and the new base station has achieved requirement of an index. To put it simply, a characteristic of the soft switch is "switch-before-break".

The channel soft switch time interval is preset and specifically refers to the time interval after the start time of switch from the first channel to the second channel, and the start time of switch from the first channel to the second channel may be obtained in two manners: one manner is that it may be directly determined if the channel switch time is the start time of switch from the first channel to the second channel; the other manner is that it may be obtained from a period of time before an end time of switch from the first channel to the second channel if the channel switch time is the end time of switch from the first channel to the second channel, and the period of time before the end time is the channel soft switch time interval.

The period of time from sending the channel switch announcement instruction to the start of a channel switch (namely, the switch from the first channel to the second channel) may be called a channel switch delay time. As a special case, the channel switch delay time may be zero, namely, the channel switch is performed immediately after the channel switch announcement instruction is sent.

Within the channel soft switch time interval, information is sent on the first channel, as well as sent on the second channel.

Step S103: sending information on the first channel is stopped if the preset channel soft switch time interval ends.

Sending information on the first channel is stopped if the channel soft switch time interval ends.

Figure 2:
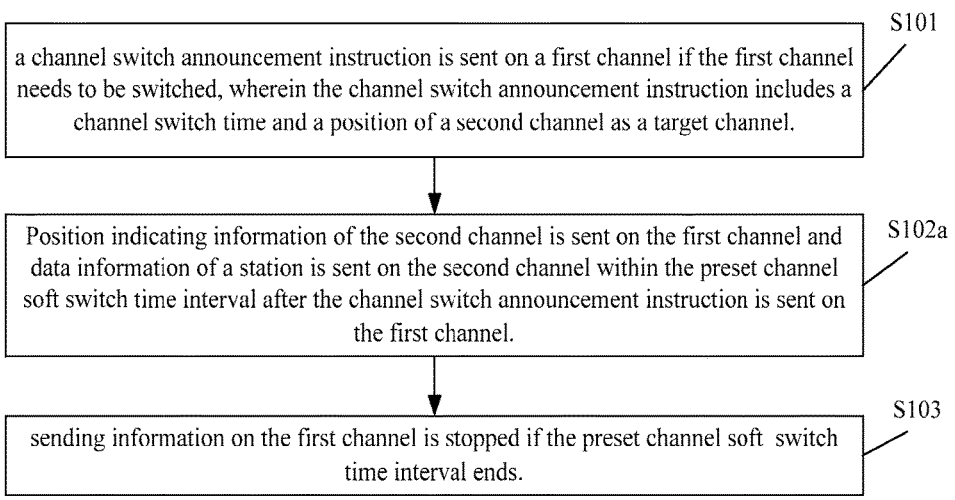
FIG. 2 is a flowchart of another embodiment of a method for channel switch in the present invention.

Content of step S102 may be divided into two cases: a first case is shown in FIG. 2 that the content of the step S102 may be changed to step S102a.

Step S102a: position indicating information of the second channel is sent on the first channel, and data information of a station is sent on the second channel within the preset channel soft switch time interval after the channel switch announcement instruction is sent on the first channel.

After the channel switch announcement instruction is sent on the first channel, it is critical to obtain position information of the second channel for a user who fails to receive the channel switch announcement instruction within the preset channel soft switch time interval. Sending the position indicating information of the second channel on the first channel helps to improve the probability that the user obtains a position of the second channel, and if the user obtains the position of the second channel, a switch may be performed from the first channel to the second channel, and thus data information of a station may be obtained from the second channel.

Figure 3:
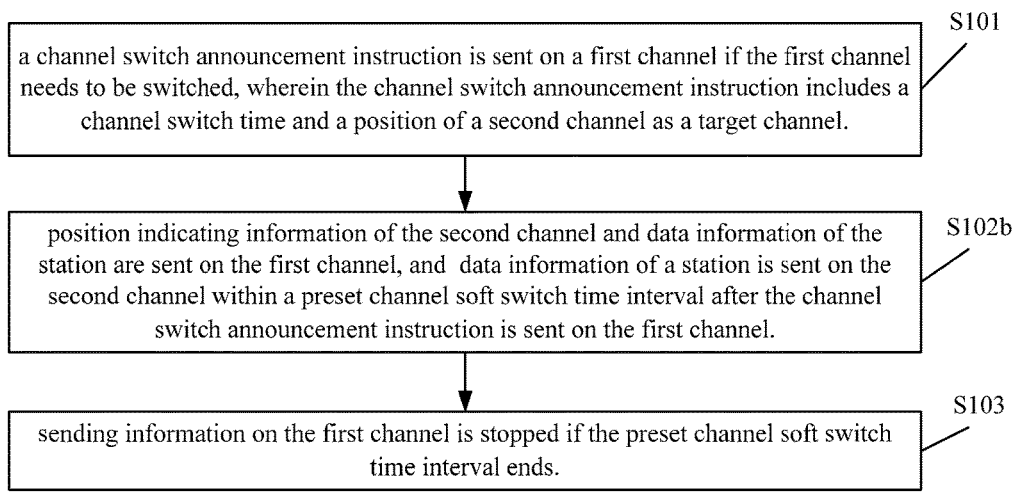
FIG. 3 is a flowchart of yet another embodiment of a method for channel switch in the present invention.

A second case is shown in FIG. 3 that the content of the step S102 may be changed to step S102b.

Step S102b: the position indicating information of the second channel and the data information of the station are sent on the first channel, and the data information of the station is sent on the second channel within the preset channel soft switch time interval after the channel switch announcement instruction is sent on the first channel.

After the channel switch announcement instruction is sent on the first channel, for a user who fails to receive the channel switch announcement instruction within the preset channel soft switch time interval, the position indicating information of the second channel and the data information of the station are sent on the first channel. On the one hand, it may help to improve the probability that the user obtains a position of the second channel on the first channel; on the other hand, it may help the user to receive the data information of the station on the first channel or the second channel or the first channel and the second channel, especially to obtain the data information of the station on the first channel and the second channel, and thus a diversity gain is obtained.

In the embodiment of the present invention, when the first channel needs to be switched, the information is sent on the target channel and the first channel within the preset channel soft switch time interval after the channel switch announcement instruction is sent on the first channel, and sending information on the first channel is stopped after the preset channel soft switch time interval ends. Since the information is sent on the target channel as well as sent on the first channel within the preset channel soft switch time interval, in this way, the probability of failure of switch of the user may be reduced in a scenario with frequent channel switch. In addition, sending the position indicating information of the second channel on the first channel helps to improve the probability that the user obtains the position of the second channel; further sending the data information of the station on the first channel helps to improve the diversity gain.

Figure 4:
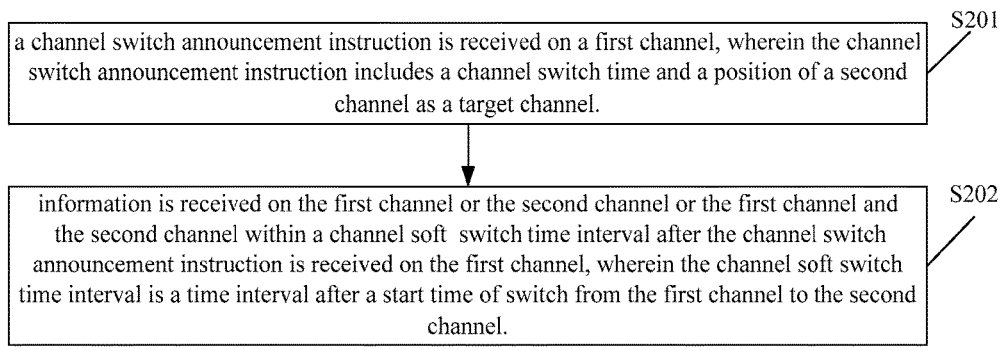
FIG. 4 is a flowchart of yet another embodiment of a method for channel switch in the present invention.

Referring to FIG. 4, FIG. 4 is a flowchart of yet another embodiment of a method for channel switch in the present invention. It should be noted that an executive body of the present embodiment is a wireless terminal, and the process includes:

Step S201: a channel switch announcement instruction is received on a first channel, wherein the channel switch announcement instruction includes a channel switch time and a position of a second channel as a target channel.

A sending end sends the channel switch announcement instruction on the first channel, a receiving end receives the channel switch announcement instruction on the first channel, for determining channel switch time and the position of the second channel as a target channel definitely so as to be ready for channel switch.

Step S202: information is received on the first channel, or the second channel, or the first channel and the second channel within a channel soft switch time interval after the channel switch announcement instruction is received on the first channel, wherein the channel soft switch time interval is a time interval after a start time of switch from the first channel to the second channel.

The receiving end may obtain the information through any one of the first channel or the second channel within the channel soft switch time interval, and may receive the information from both the first channel and the second channel. Therefore, even if the channel switch is performed frequently within the channel soft switch time interval, the probability of switch failure will be greatly reduced.

Figure 5:
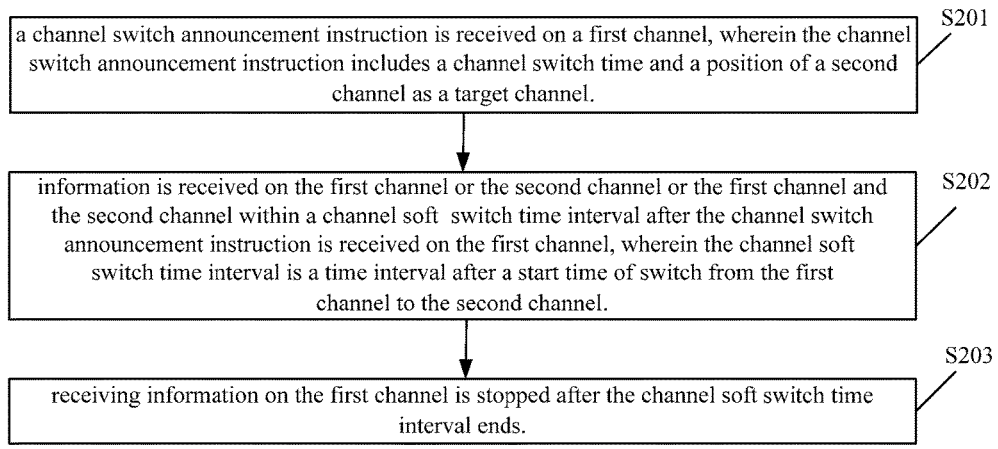
FIG. 5 is a flowchart of yet another embodiment of a method for channel switch in the present invention.

Referring to FIG. 5, after the step S202, the embodiment of the present invention further includes step S203, and detailed description is as follows:

Step S203: receiving information on the first channel is stopped after the channel soft switch time interval ends.

After the channel soft switch time interval ends, the receiving end only receives the information on the second channel.

In the embodiment of the present invention, the information is received from the target channel and the first channel within a preset channel soft switch time interval after the channel switch announcement instruction is received on the first channel. Since the information is received from the target channel as well as received from the first channel within the preset channel soft switch time interval, in this way, the probability of switch failure for the user may be reduced in a scenario with frequent channel switch.

A practical application of the present invention will be illustrated by taking the following examples.

Figure 6:
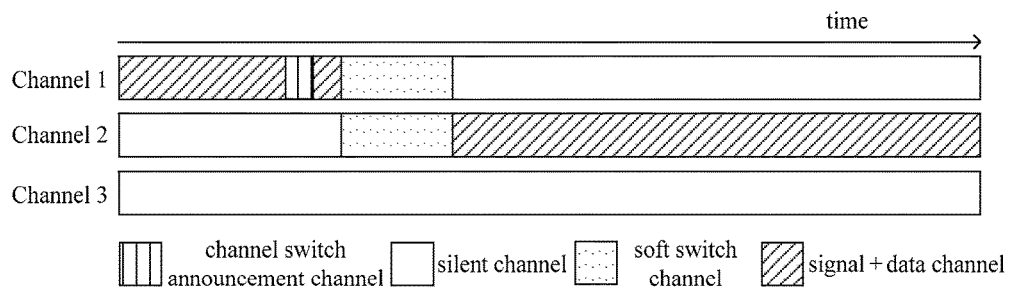
FIG. 6 is a schematic diagram of an application example of a method for channel switch in the present invention.

As shown in FIG. 6, a system may select one channel from multiple channels as a communication channel, and the channel herein may be an actual channel, or may be also a logical channel composed of multiple continuous or discontinuous sub-channels. There is no limit to the number of total channels, and in order to facilitate description, a scenario of three channels in FIG. 6 is taken for illustration.

In FIG. 6, it is supposed that the system originally operates on channel 1 (i.e., a first channel), and the channel needs to be switched due to interference, regulation restriction, backoff or other reasons. A channel switch announcement instruction is sent first on the original channel (i.e., channel 1), and the channel switch announcement instruction will announce a channel switch time and a position of a target channel (i.e., a second channel) in an explicit manner or an implicit manner. The explicit manner is a manner of making an announcement through an instruction, and the implicit manner is a manner of making the announcement through an appointed or default rule. A period of time from sending the channel switch announcement instruction and to the start of a channel switch may be called a channel switch delay time. As a special case, the channel switch delay time may be zero, namely, the channel switch is performed immediately after the channel switch announcement instruction is sent.

There is a channel soft switch time interval after the channel switch time starts. Within the channel soft switch time interval, information is sent on a new channel 2 (i.e., the second channel), as well as sent on an old channel 1 (i.e., the first channel). There are two cases: one case is that data information of a station is sent on the new channel 2 (i.e., the second channel), and position indicating information of the second channel is sent on the old channel 1 (i.e., the first channel); the other case is that the data information of the station is sent on the new channel 2, and the position indicating information of the second channel and the data information of the station are sent on the old channel 1. For the second case, during this period a user may obtain the data information of the station through any one of the new channel 2 (i.e., the second channel) or the old channel 1 (i.e., the first channel), and may further receive the data information of the station on both the two channels to obtain a diversity gain. Within the channel soft switch time interval, a position of the new channel 2 (i.e., the second channel) is indicated on the old channel 1 (i.e., the first channel) in an explicit manner or an implicit manner.

Sending information on the old channel 1 (i.e., the first channel) is stopped after the channel soft switch time interval ends.

Figure 7:
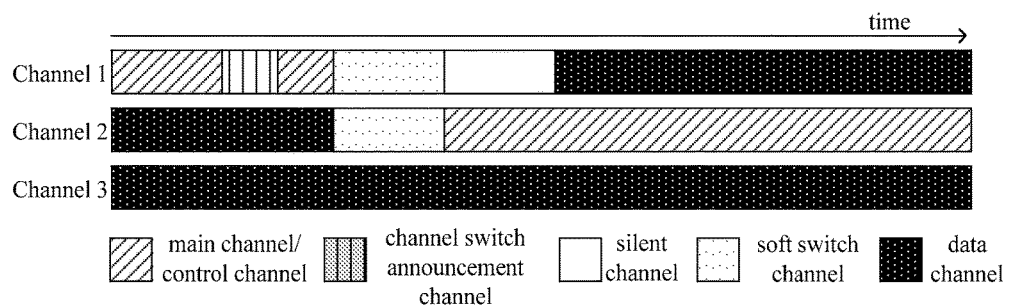
FIG. 7 is a schematic diagram of another application example of a method for channel switch in the present invention.

Referring to FIG. 7, a system operates on multiple channels, but only one channel is taken as a main channel or a control channel. The main channel means all communications must use one or more channels containing the main channel, and the control channel refers to a channel used for sending control and management information. Channels except for the main channel/control channel are collectively referred to as data channels. There is no limit to the number of total channels, and in order to facilitate description, a scenario of three channels in FIG. 7 is taken for illustration, wherein a position of the main channel/control channel does not have to be limited on channel 1. For purposes of brevity, the main channel is taken as an example for illustration; however, the process thereof is also applicable to a case of the control channel.

When the main channel needs to be released due to interference, regulation restriction, backoff or other reasons, or the channel is no longer applicable to serve as the main channel because quality of the channel becomes poor, a channel switch announcement instruction is sent first on an original main channel (i.e., channel 1, a first channel). The channel switch announcement instruction will announce a channel switch time and a position of a target main channel 2 (i.e., a second channel) in an explicit manner or an implicit manner. The explicit manner is a manner of making an announcement through an instruction and the implicit manner is a manner of making the announcement through an appointed or default rule. The period of time from sending the channel switch announcement instruction to the start of a channel switch may be called a channel switch delay time. As a special case, the channel switch delay time may be zero, namely, the channel switch is performed immediately after the channel switch announcement instruction.

There is a channel soft switch time interval after the channel switch time starts. Within the channel soft switch time interval, information is sent on a new main channel 2 (i.e., the second channel), as well as sent on an old main channel 1 (i.e., the first channel). There are two cases: one case is that data information of a station is sent on the new main channel 2 (i.e., the second channel), and position indicating information of the second channel is sent on the old main channel 1 (i.e., the first channel); the other case is that the data information of the station is sent on the new main channel 2, and the position indicating information of the second channel and the data information of the station are sent on the old main channel 1. For the second case, during this period a user may obtain the data information of the station through any one of the new main channel 2 (i.e., the second channel) or the old main channel 1 (i.e., the first channel), and may further receive the data information of the station on both the two channels to obtain a diversity gain. Within the channel soft switch time interval, a position of the new main channel 2 (i.e., the second channel) is indicated on the old main channel 1 (i.e., the first channel) in an explicit manner or an implicit manner.

Sending information on the old main channel 1 (i.e., the first channel) is stopped after the channel soft switch time interval ends. If the old main channel 1 (i.e., the first channel) needs to be released after the channel soft switch time interval ends, a silent period will occur on the old main channel 1 (i.e., the first channel), and during the silent period no sending or receiving will be performed on the old main channel 1 (i.e., the first channel). After the silent period, if the system obtains a sending permission on the old main channel 1 (i.e., the first channel) again, the old main channel 1 (i.e., the first channel) may be used as a data channel. If the old main channel 1 (i.e., the first channel) doesn't need to be released after the channel soft switch time interval ends, the old main channel 1 (i.e., the first channel) may be directly used as the data channel.

Figure 8:
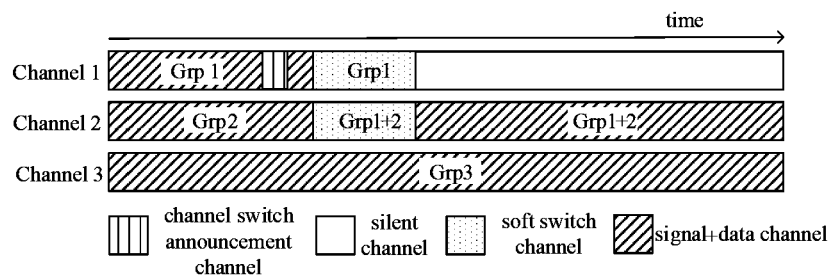
FIG. 8 is a schematic diagram of yet another application example of a method for channel switch in the present invention.

Referring to FIG. 8, a system operates on multiple channels and each user anchors on a certain channel. Anchoring here refers to obtaining management and control information from the channel, and it is not necessary for sending and receiving of data to be limited to an anchoring channel. There is no limit to the number of total channels, and in order to facilitate description, a scenario of three channels in FIG. 8 is taken for illustration. Before channel switch, users anchors on channels 1, 2 and 3 are called Grp1, Grp2 and Grp3 respectively. In FIG. 8, a switch from channel 1 (i.e., a first channel) to channel 2 (i.e., a second channel) for user(s) of Grp1 is taken as an example for illustration.

When channel 1 (i.e., the first channel) needs to be released due to interference, regulation restriction, backoff or other reasons, or the channel is no longer applicable to serve as the anchoring channel because quality of the channel becomes poor, a channel switch announcement instruction is sent first on an original channel (i.e., channel 1, the first channel). The channel switch announcement instruction will announce a channel switch time and a position of a target channel (i.e., the second channel) in an explicit manner or an implicit manner. The explicit manner is a manner of making an announcement through an instruction and the implicit manner is a manner of making the announcement through an appointed or default rule. The period of time from sending the channel switch announcement instruction to the start of a channel switch may be called a channel switch delay time. As a special case, the channel switch delay time may be zero, namely, the channel switch is performed immediately after the channel switch announcement instruction.

There is a channel soft switch time interval after the channel switch time starts. Within the channel soft switch time interval, information is sent on a new channel 2 (i.e., the second channel), as well as sent on an old channel 1 (i.e., the first channel). There are two cases: one case is that data information of a station is sent on the new channel 2 (i.e., the second channel), and position indicating information of the second channel is sent on the old channel 1 (i.e., the first channel); the other case is that the data information of the station is sent on the new channel 2, and the position indicating information of the second channel and the data information of the station are sent on the old channel 1. For the second case, during this period the user(s) of Grp1 may obtain the data information of the station through any one of the new channel 2 (i.e., the second channel) or the old channel 1 (i.e., the first channel), and may further receive the data information of the station on both the two channels to obtain a diversity gain. Within the channel soft switch time interval, a position of the new channel 2 (i.e., the second channel) is indicated on the old channel 1 (i.e., the first channel) in an explicit manner or an implicit manner.

Sending information on the old channel 1 (i.e., the first channel) is stopped after the channel soft switch time interval ends. If the old channel 1 (i.e., the first channel) needs to be released after the channel soft switch time interval ends, a silent period will occur on the old channel 1 (i.e., the first channel), and during the silent period no sending or receiving will be performed on the old channel 1 (i.e., the first channel). If the old channel 1 (i.e., the first channel) is not applicable to serve as the anchoring channel merely because of quality of the channel or the like, the old channel 1 (i.e., the first channel) may be used as a data channel.

Figure 9:
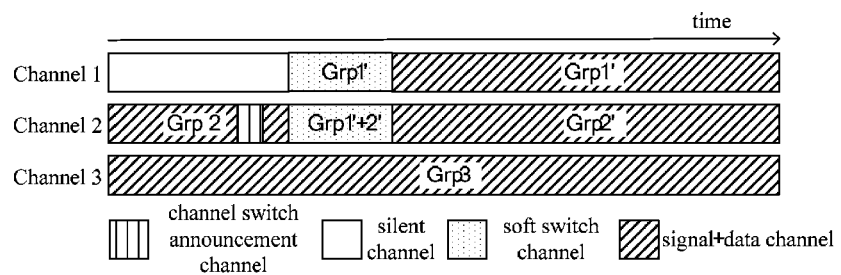
FIG. 9 is a schematic diagram of yet another application example of a method for channel switch in the present invention.

Referring to FIG. 9, a system operates on multiple channels and each user anchors on a certain channel. Anchoring here refers to obtaining management and control information from the channel, and it is not necessary for sending and receiving of data to be limited on an anchoring channel. There is no limit to the number of total channels, and in order to facilitate description, a scenario of three channels in FIG. 9 is taken for illustration. Before channel switch, users who anchor on channels 2 and 3 are called Grp2 and Grp3 respectively. In FIG. 9, a process that switch of some users from certain original anchoring channels (here channel 2 is taken as an example) to a new anchoring channel after the new anchoring channel (channel 1) is obtained will be illustrated.

After the system obtains a new channel (channel 1, a second channel) that may be used as the anchoring channel, some users may switch from an original anchoring channel (channel 2, a first channel) to the new anchoring channel (a second channel). A channel switch announcement instruction is sent first on an original channel 2 (i.e., channel 2, the first channel), and the channel switch announcement instruction will announce a channel switch time and a position of a target channel (the second channel) as well as user(s) who needs switch in an explicit manner or an implicit manner. The explicit manner is a manner of making an announcement through an instruction, and the implicit manner is a manner of making the announcement through an appointed or default rule. A period of time from sending the channel switch announcement instruction to the start of a channel switch may be called a channel switch delay time. As a special case, the channel switch delay time may be zero, namely, the channel switch is performed immediately after the channel switch announcement instruction.

User(s) who needs switch is called Grp 1' and user(s) still who anchors on the channel 2 is called Grp 2'. There is a channel soft switch time interval after the channel switch time starts. Within the channel soft switch time interval, information is sent on a new channel 1 (i.e., the second channel), as well as sent on an old channel 2 (i.e., the first channel). There are two cases: one case is that data information of a station is sent on the new channel 1 (i.e., the second channel), and position indicating information of the second channel is sent on the old channel 2 (i.e., the first channel); the other case is that the data information of the station is sent on the new channel 1, and the position indicating information of the second channel and the data information of the station are sent on the old channel 2. For the second case, during this period the user(s) of Grp 1' may obtain the data information of the station through any one of the new channel 1 (i.e., the second channel) or the old channel 2 (i.e., the first channel), and may further receive the data information of the station on both the two channels to obtain a diversity gain. Within the channel soft switch time interval, a position of the new channel 1 (i.e., the second channel) is indicated on the old channel 2 (i.e., the first channel) in an explicit manner or an implicit manner.

Sending information to the users of Grp 1' on the old channel 2 (i.e., the first channel) is stopped after the channel soft switch time interval ends, and the information is only sent to the users of Grp 2' on the old channel 2.

Figure 10:
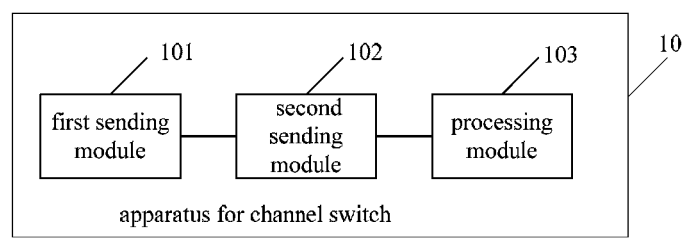
FIG. 10 is a schematic diagram of a structure of an embodiment of an apparatus for channel switch in the present invention.

Referring to FIG. 10, FIG. 10 is a schematic diagram of a structure of an embodiment of an apparatus for channel switch in the present invention, and the apparatus 10 includes: a first sending module 101, a second sending module 102 and a processing module 103.

The first sending module 101 is configured to send a channel switch announcement instruction on a first channel when the first channel needs to be switched, wherein the channel switch announcement instruction includes a channel switch time and a position of a second channel as a target channel, and send the channel switch announcement instruction, which has been sent, to the second sending module 102 and the processing module 103.

A system frequently detects currently available channels, and when the first channel needs to be switched due to interference, regulation restriction, backoff or other reasons, the channel switch announcement instruction is sent on the first channel, wherein the channel switch announcement instruction includes the channel switch time and the position of the second channel as a target channel, wherein the channel switch time is a start time or an end time of switch from the first channel to the second channel. In a practical application, the channel switch time generally refers to the start time of switch from the first channel to the second channel.

The channel switch announcement instruction is sent in an explicit manner or an implicit manner, wherein the explicit manner is a manner making an announcement through an instruction, and the implicit manner is a manner making the announcement through an appointed or default rule.

The first channel may be a control channel, or a hybrid channel of a control channel and a data channel. The control channel, or called signal channel, main channel, anchoring channel and the like, refers to a channel used for sending control and management information, and the data channel refers to a channel used for sending data information.

The second sending module 102 is configured to receive the channel switch announcement instruction sent by the first sending module 101, and send information on the first channel and the second channel within a preset channel soft switch time interval, wherein the channel soft switch time interval is a time interval after a start time of switch from the first channel to the second channel.

The channel soft switch time interval is preset and specifically refers to a time interval after a start time of switch from the first channel to the second channel, and the start time of switch from the first channel to the second channel may be obtained through two manners: one manner is that it may be directly determined if the channel switch time is the start time of switch from the first channel to the second channel; the other way is that it may be obtained from a period of time before an end time of switch from the first channel to the second channel if the channel switch time is the end time of switch from the first channel to the second channel, and the period of time before the end time is the channel soft switch time interval.

Within the channel soft switch time interval, information is sent on the first channel, as well as sent on the second channel.

The processing module 103 is configured to receive the channel switch announcement instruction sent by the first sending module 101, and stop sending information on the first channel when the preset channel soft switch time interval ends.

Sending information on the first channel is stopped if the channel soft switch time interval ends and the information is only sent on the second channel.

The second sending module 102 is specifically divided into two cases: a first case is that the second sending module 102 is specifically configured to send position indicating information of the second channel on the first channel and send data information of a station on the second channel within the preset channel soft switch time interval after the channel switch announcement instruction is sent on the first channel.

After the channel switch announcement instruction is sent on the first channel, it is critical to obtain position information of the second channel for a user who fails to receive the channel switch announcement instruction within the preset channel soft switch time interval. Sending the position indicating information of the second channel on the first channel helps to improve the probability that the user obtains a position of the second channel, and when the user obtains the position of the second channel, the user may switchs from the first channel to the second channel, and thus the data information of the station may be obtained on the second channel.

A second case is that the second sending module 102 is specifically configured to send the position indicating information of the second channel and the data information of the station on the first channel, and send the data information of the station on the second channel within the preset channel soft switch time interval after the channel switch announcement instruction is sent on the first channel.

After the channel switch announcement instruction is sent on the first channel, for a user who fails to receive the channel switch announcement instruction, the position indicating information of the second channel and the data information of the station are sent on the first channel within the preset channel soft switch time interval. On the one hand, it may help to improve the probability that the user obtains a position of the second channel on the first channel; on the other hand, it may help the user to receive the data information of the station on the first channel, or the second channel, or the first channel and the second channel, especially obtain the data information of the station on the first channel and the second channel, and thus a diversity gain is obtained.

In the embodiment of the present invention, when the first channel needs to be switched, the information is sent on the target channel and the first channel within the preset channel soft switch time interval after the channel switch announcement instruction is sent on the first channel, and sending information on the first channel is stopped after the preset channel soft switch time interval ends. Since the information is sent on the target channel as well as sent on the first channel within the preset channel soft switch time interval, in this way, the probability of switch failure for the user may be reduced in a scenario with frequent channel switch. In addition, sending the position indicating information of the second channel on the first channel helps to improve the probability that the user obtains the position of the second channel; further sending the data information of the station on the first channel helps to improve the diversity gain.

Figure 11:
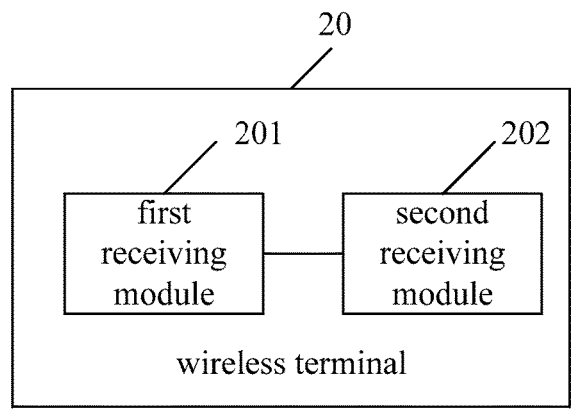
FIG. 11 is a schematic diagram of a structure of an embodiment of a wireless terminal in the present invention.

Referring to FIG. 11, FIG. 11 is a schematic diagram of a structure of an embodiment of a wireless terminal in the present invention, and the wireless terminal 20 includes a first receiving module 201 and a second receiving module 202.

The first receiving module 201 is configured to receive a channel switch announcement instruction on a first channel, wherein the channel switch announcement instruction includes a channel switch time and a position of a second channel as a target channel, and send the received channel switch announcement instruction to the second receiving module 202.

A sending end sends the channel switch announcement instruction on the first channel, a receiving end receives the channel switch announcement instruction on the first channel, for determining the channel switch time and the position of the second channel as a target channel definitely so as to be ready for channel switch.

The second receiving module 202 is configured to receive the channel switch announcement instruction sent by the first receiving module 201 and receive information on the first channel, or the second channel, or the first channel and the second channel within a channel soft switch time interval, wherein the channel soft switch time interval is a time interval after a start time of switch from the first channel to the second channel.

The receiving end may obtain the information through any one of the first channel or the second channel within the channel soft switch time interval, and may receive the information from both the first channel and the second channel. Therefore, even if the channel switch is performed frequently within the channel soft switch time interval, the probability of switch failure will be greatly reduced.

Figure 12:
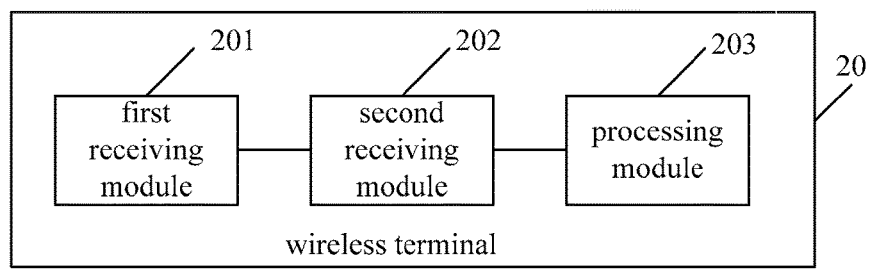
FIG. 12 is a schematic diagram of a structure of another embodiment of a wireless terminal in the present invention.

Referring to FIG. 12, the wireless terminal 20 of the embodiment of the present invention further includes a processing module 203.

The processing module 203 is configured to receive the channel switch announcement instruction sent by the first receiving module 201 and stop receiving information on the first channel after the channel soft switch time interval ends.

After the channel soft switch time interval ends, the receiving end only receives the information on the second channel.

In the embodiment of the present invention, the information is received from the target channel and the first channel within a preset channel soft switch time interval after the channel switch announcement instruction is received on the first channel. Since the information is received from the target channel as well as received from the first channel within the preset channel soft switch time interval, in this way, the probability of switch failure for the user may be reduced in a scenario with frequent channel switch.

Figure 13:
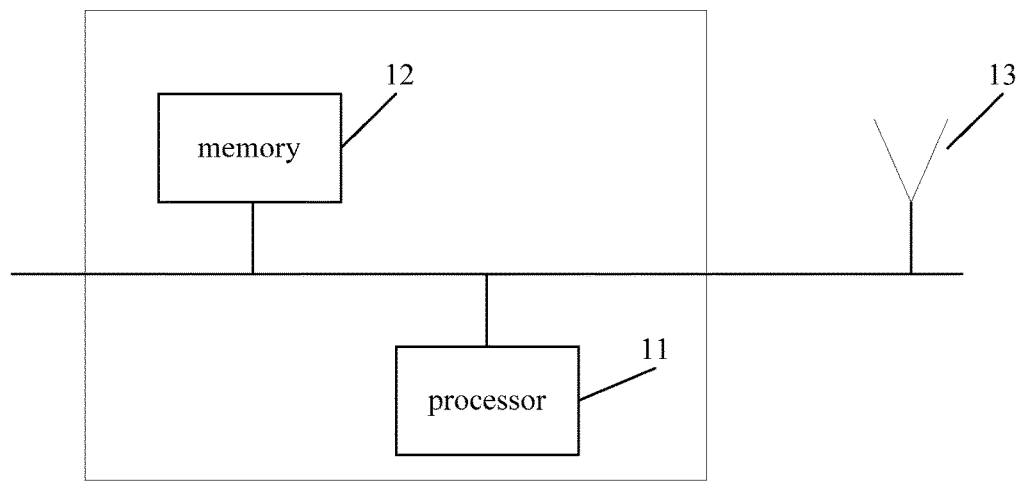
FIG. 13 is a schematic diagram of a structure of yet another embodiment of an apparatus for channel switch in the present invention.

Referring to FIG. 13, FIG. 13 is a schematic diagram of a structure of yet another embodiment of an apparatus for channel switch in the present invention. The apparatus includes a processor 11 and a memory 12 coupled with the processor, and the apparatus of the embodiment of the present invention sends information and data by an antenna 13 of a transmitting circuit.

The processor 11 is configured to control the antenna 13 of the transmitting circuit to send a channel switch announcement instruction on a first channel when the first channel needs to be switched, wherein the channel switch announcement instruction includes a channel switch time and a position of a second channel as a target channel; control the antenna 13 of the transmitting circuit to send information on the first channel and the second channel within a preset channel soft switch time interval after the channel switch announcement instruction is sent on the first channel, wherein the channel soft switch time interval is a time interval after a start time of switch from the first channel to the second channel; control the antenna 13 of the transmitting circuit to stop sending information on the first channel if the preset channel soft switch time interval ends.

In the embodiment of the present invention, when the first channel needs to be switched, the information is sent on the target channel and the first channel within the preset channel soft switch time interval after the channel switch announcement instruction is sent on the first channel, and sending information on the first channel is stopped after the preset channel soft switch time interval ends. Since the information is sent on the target channel as well as sent on the first channel within the preset channel soft switch time interval, in this way, the probability of switch failure for the user may be reduced in a scenario with frequent channel switch.

In the several embodiments provided in the present invention, it should be understood that, the disclosed system, apparatus and method may be implemented in other manners. For example, the apparatus embodiments described above are merely exemplary, e.g., the division of the modules or units is only a logic function division, other division manners may exist in practical implementation, for example, multiple units or components may be combined or integrated to another system, or some features may be omitted or not implemented. In addition, the displayed or discussed mutual coupling or direct coupling or communication connection may be indirect coupling or communication connection through some interfaces, devices or units, and may be in electrical, mechanical or other forms.

The units described as separate components may be separated physically or not, components displayed as units may be physical units or not, namely, may be located in one place, or may also be distributed on multiple network units. A part of or all of the units may be selected to achieve the purposes of the technical solutions in the embodiments of the present invention according to actual demands.

In addition, the functional units in the embodiments of the present invention may be integrated in a processing unit, or the units singly exist physically, or two or more units are integrated in one unit. The above-mentioned integrated unit may be implemented in the form of hardware and may also be implemented in the form of a software functional unit.

If the integrated unit is implemented in the form of the software functional unit and is sold or used as an independent product, it may be stored in a computer readable storage medium. Based on this understanding, the technical solutions of the present invention substantially, or the part contributing to the prior art, or all or a part of the technical solutions may be implemented in the form of a software product, the computer software product is stored in a storage medium, and includes a plurality of instructions enabling a computer device (may be a personnel computer, a server, or a network device, etc.) or a processor (processor) to execute all or a part of the steps of the methods in the embodiments of the present invention. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

What is claimed is:

1. A method for performing a channel switch, comprising:
   sending a channel switch announcement instruction on a first channel if the first channel needs to be switched, wherein the channel switch announcement instruction comprises a channel switch time and a position of a second channel as a target channel;
   sending information on the first channel and the second channel within a preset channel soft switch time interval after the channel switch announcement instruction is sent on the first channel, wherein the channel soft switch time interval is a time interval after a start time of a switch from the first channel to the second channel; and stopping sending information on the first channel if the preset channel soft switch time interval ends;

wherein the sending information on the first channel and the second channel within the preset channel soft switch time interval after the channel switch announcement instruction is sent on the first channel comprises: sending the position indicating information of the second channel and data information of the station on the first channel, and sending the data information of the station on the second channel within the preset channel soft switch time interval after the channel switch announcement instruction is sent on the first channel, wherein the first channel is a hybrid channel of a control channel and a data channel, and the second channel is a data channel; and wherein after the preset channel soft switch time interval ends, the first channel is used as a data channel.

2. The method according to claim 1, wherein a channel switch delay time is included between a time of sending a channel switch announcement instruction and the start time of the switch from the first channel to the second channel.

3. The method according to claim 2, wherein the channel switch delay time is zero.

4. The method according to claim 1, wherein after the preset channel soft switch time interval ends, further comprising:
releasing the first channel, and using the first channel as a data channel after a silent period which occurs on the first channel.

5. A method for performing a channel switch, comprising:
receiving a channel switch announcement instruction on a first channel, wherein the channel switch announcement instruction comprises a channel switch time and a position of a second channel as a target channel;
receiving information on the first channel and the second channel within a channel soft switch time interval after the channel switch announcement instruction is received on the first channel, wherein the channel soft switch time interval is a time interval after a start time of a switch from the first channel to the second channel, wherein receiving information on the first channel and the second channel within a channel soft switch time interval after the channel switch announcement instruction is received on the first channel comprises: receiving the position indicating information of the second channel and data information of the station on the first channel and the data information of the station on the second channel within the channel soft switch time interval after the channel switch announcement instruction is received on the first channel, wherein the first channel is a hybrid channel of a control channel and a data channel, and the second channel is a data channel; and wherein after the preset channel soft switch time interval ends, the first channel is used as a data channel.

6. The method according to claim 5, wherein the method further comprises: stopping receiving information on the first channel after the channel soft switch time interval ends.

7. An apparatus for performing a channel switch, wherein the apparatus comprises: a first sender, a second sender and a processor,
wherein the first sender is configured to send a channel switch announcement instruction on a first channel when the first channel needs to switch, wherein the channel switch announcement instruction comprises a channel switch time and a position of a second channel as a target channel, and the first sender is further configured to send the channel switch announcement instruction, which has been sent, to the second sender and the processor;

the second sender is configured to receive the channel switch announcement instruction sent by the first sending module, and send information on the first channel and the second channel within a preset channel soft switch time interval, wherein the channel soft switch time interval is a time interval after a start time of a switch from the first channel to the second channel;

the processor is configured to receive the channel switch announcement instruction sent by the first sender, and stop sending information on the first channel when the preset channel soft switch time interval ends;

wherein the second sender is specifically configured to send the position indicating information of the second channel and data information of the station on the first channel, and send the data information of the station on the second channel within the preset channel soft switch time interval, wherein the first channel is a hybrid channel of a control channel and a data channel, and the second channel is a data channel; and wherein the processor is further configured to use the first channel as a data channel after the preset channel soft switch time interval ends.

8. The apparatus according to claim 7, wherein a channel switch delay time is included between a time of sending a channel switch announcement instruction and the start time of the switch from the first channel to the second channel.

9. The apparatus according to claim 8, wherein the channel switch delay time is zero.

10. The apparatus according to claim 7, wherein the processor is further configured to release the first channel after the preset channel soft switch time interval ends, and use the first channel as a data channel after a silent period which occurs on the first channel.

11. A wireless terminal, wherein the terminal comprises: a first receiver, a second receiver and a processor,
wherein the first receiver is configured to receive a channel switch announcement instruction on a first channel, wherein the channel switch announcement instruction comprises a channel switch time and a position of a second channel as a target channel, and the first receiving module is further configured to send the channel switch announcement instruction, which has been received, to the second receiving module;

the second receiver is configured to receive the channel switch announcement instruction and receive information on the first channel and the second channel within a channel soft switch time interval, wherein the channel soft switch time interval is a time interval after a start time of a switch from the first channel to the second channel;

wherein the second sender receiver is specifically configured to receive the position indicating information of the second channel and data information of the station on the first channel and the data information of the station on the second channel within the channel soft switch time interval after the channel switch announcement instruction is received on the first channel, wherein the first channel is a hybrid channel of a control channel and a data channel, and the second channel is a data channel; and wherein the processor is further configured to use the first channel as the data channel after the preset channel soft switch time interval ends.

12. The wireless terminal according to claim 11, wherein the processor is configured to receive the channel switch announcement instruction sent by the first receiver and stop receiving information on the first channel after the channel soft switch time interval ends.

* * * * *